No. 740,451. PATENTED OCT. 6, 1903.
R. W. MANSFIELD.
EDUCATIONAL AND PUZZLE BLOCKS.
APPLICATION FILED DEC. 30, 1902.

NO MODEL.

WITNESSES:
Geo. V. Rasmussen

INVENTOR
Richard W. Mansfield
BY
ATTORNEY

No. 740,451.

Patented October 6, 1903.

UNITED STATES PATENT OFFICE.

RICHARD W. MANSFIELD, OF NEW LONDON, CONNECTICUT.

EDUCATIONAL AND PUZZLE BLOCK.

SPECIFICATION forming part of Letters Patent No. 740,451, dated October 6, 1903.

Application filed December 30, 1902. Serial No. 137,109. (No model.)

*To all whom it may concern:*

Be it known that I, RICHARD W. MANSFIELD, a citizen of the United States, residing at New London, New London county, Connecticut, have invented certain new and useful Improvements in Educational and Puzzle Blocks, of which the following is a full, clear, and exact description.

My invention relates to improvements in educational and puzzle blocks, and particularly to that class as set forth in Letters Patent No. 717,105, granted to me December 30, 1902.

The object of my invention is to provide a block or series of blocks with illustrations or illustrative matter thereon in such an order, sequence, or arrangement that when the block or series is turned about their different axes in the proper order and direction a predetermined series of illustrations bearing some consecutive arrangement will be brought to view. By this means blocks may be made to convey educational suggestions and at the same time serve as a medium of amusement.

The invention consists in forming blocks having more than four sides and placing on the different sides letters, numbers, words, or other illustrative matter in such an order, beginning with what may be termed the "key-face," that when the blocks are turned in the proper consecutive order from this key-face the unitary ideas set forth thereon may be brought to view. The blocks may be formed either solid or in the form of hollow boxes. Obviously the corners need not be pointed and the sides or edges might be indented, if desired. The form shown in this application of my invention more specifically relates to illustrative matter arranged on a single block or on a single line of blocks, whereas that form shown in my patent above referred to relates to a set of blocks in general irrespective of the number of lines.

Figure 1:
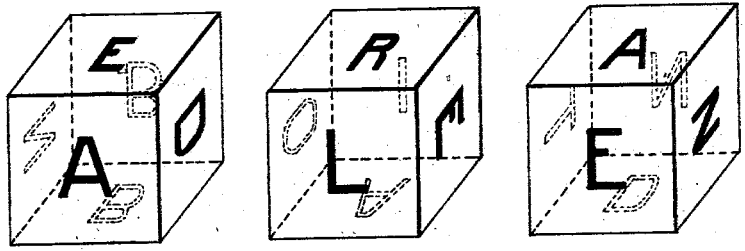
Figure 2:
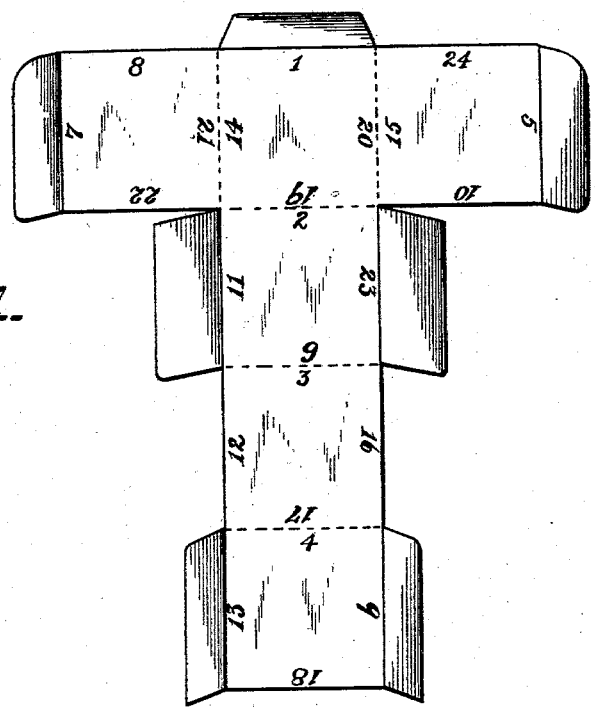
Figure 3:
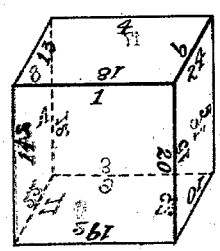

Figure 1 represents in perspective a series of blocks forming a line which embodies my invention, each block of which independently also embodies my invention. Fig. 2 is a developed view showing the relative positions of the surface of a block or of a blank from which a block may be formed in the shape of a hollow box. Fig. 3 is a perspective view of a block bearing the numerals arranged as in the blank of Fig. 2.

Referring to the blocks of Fig. 1, each obviously has three imaginary axes, all of which are at right angles to each other and correspond to the planes of the different faces. Similarly the series of blocks may be considered to have three imaginary axes corresponding to the different planes of their faces. If the left-hand block of Fig. 1 is revolved about a horizontal axis parallel to the front face, the letters "A," "B," "B," "E," forming the word "Abbe," will be brought consecutively to view. If the blank is now revolved about a horizontal axis parallel to the plane of the top face through a quarter of revolution to the right and then through a half-revolution to the left, the letters "N," "E," "D" will appear, constituting the abbreviated name "Ned." The central block in a similar manner will be seen to bear the letters "L," "A," "I," "R" and about the other axis the letters "O," "R," "E." The right-hand block similarly bears the letters "E," "D," "N," "A" and at right angles thereto "T," "A," "N." Considering the blocks to be combined into a series of a single line, we read on the front face "A," "L," "E." Turning the blocks consecutively about the horizontal axis parallel to the front face the words "Bad," "Bin," and "Era" will be brought to view. If now each block is revolved through a quarter of a turn to the right about a horizontal axis parallel to its top face, the word "Not" will appear. By then turning the entire line over the word "Ned" will appear. Obviously any other series of letters might be employed or each block might have on each face a word, as in the patent referred to.

To use the blocks to carry out the idea of a puzzle, it is merely necessary to turn them over once or twice and then attempt, without knowing the proper key-face, to ascertain what the illustration of the key-face is and then to ascertain the proper direction of turns necessary to bring out the entire series of illustrations.

The block shown in Fig. 3 has for convenience a set of numbers arranged on the different faces, as more clearly will be seen on the developed view in Fig. 2. Any series of letters or words or other illustrations might be substituted for these numerals. The principle which it is endeavored to convey by the forms shown in the drawings is equally applicable to other illustrations, those selected being for the purpose of making the idea more easily understood. In the form shown in Fig. 3 each face bears four numerals, and all of the numerals combined on the six faces of the block are so arranged that by regular turns of the block the entire series of numbers may be brought consecutively to view. On the front face appears the numeral "1" near the upper edge. Each numeral as it is brought to view in the series will be found in a similar location on its proper face. The block is then rotated about a horizontal axis parallel to the front face, when the numbers "1," "2," "3," and "4" will appear. It should be next revolved about a horizontal axis perpendicular to the front face, when the numerals "4," "5," "6," and "7" will appear. The block is next revolved through ninety degrees on an axis perpendicular to the new top face, bringing the numeral "8" at the top edge. The block is then revolved about an axis parallel to this face and the numerals "9," "10," and "11" appear. If it is now revolved about an axis perpendicular to the front face, the numerals "12," "13," and "14" will appear. The block should then be revolved about a horizontal axis parallel to that face, revealing in turn the numerals "15" and "16." The block should then be turned through ninety degrees about an axis perpendicular to the face bearing the numeral "16" to bring the numeral "17" at the top. It should then be revolved through a horizontal axis parallel to the same face and the numerals "18" and "19" will appear. By turning the block about an axis perpendicular to its face the numeral "20" will be brought to the top edge. Then by turning the block about a horizontal axis parallel to this face the numeral "21" will be brought to view. The block should then be turned about an axis perpendicular to the latter plane through ninety degrees, when the numeral "22" will appear. Then by turning the block about a horizontal axis parallel to the same plane the numerals "23" and "24" may be brought consecutively to view, thus revealing the entire series of numerals. Obviously a series of words or letters constituting a sentence or sentences might be substituted for the numerals and brought to view by a proper series of turns—for instance, substituting for the numerals in order the words as follows: "By this block you will see that interest and instruction may be provided for both young and old at one and the same time." A series of names might also be arranged in place of the numerals such that the initial letters would spell out a series of several names or words—as, for instance, substitute for the numerals names of the places in order, as follows: Troy, Hartford, Erie, Uganda, Norwich, Ithaca, Toronto, Edam, Detroit, Sardis, Texas, Alabama, Tennessee, Edinburgh, Spain, Ohio, Florida, America, Mexico, Egypt, Russia, India, China, Abyssinia, the initials of which spell "The United States of America." When a series of blocks involving the "single" block form of my invention have been planned with that end in view, they may all be used together in the "single-line" form. Obviously the same is true where a set of blocks is used having a plurality of lines, except that the problem is more complicated.

What I claim is—

1. A plurality of blocks adapted to be arranged in a single line and bearing illustrations such that when the blocks are arranged in the proper order starting with a given key-face they may be rotated about an axis parallel to the key-face and individually about axes at right angles thereto to bring to view a predetermined series in order.

2. A set of cubiform blocks adapted to be arranged in a line, each block bearing illustrations such that in combination with the illustrations on the other blocks when they have been arranged in a predetermined manner a series of illustrations may be brought to view by turning the blocks about an axis parallel to a given key-face, by turning each block about an axis at an angle to the first axis and by turning over the entire series of blocks.

3. A block, a plurality of illustrations on each of more than four sides so arranged relatively to each other that a predetermined series may be brought to view by turning the block in order about axes at different angles to each other.

4. A cubiform block, illustrations near the edges of each of more than four faces so arranged relatively to one another that starting with a given key-face a predetermined series may be brought to view by turning the block about axes at different angles to each other in the proper order.

5. A cubiform body, a plurality of illustrations on each of six faces so arranged that by turning the body in the proper order about axes at right angles to each other the predetermined series will be brought to view.

Signed at New London, Connecticut, this 22d day of December, 1902.

RICHARD W. MANSFIELD.

Witnesses:
GRACE E. HARTSHORN,
SIDNEY H. MINER.